(12) United States Patent
Condon

(10) Patent No.: US 11,480,130 B2
(45) Date of Patent: *Oct. 25, 2022

(54) PARABOLIC COMBUSTION ENGINE

(71) Applicant: Richard William Condon, Frankfort, IL (US)

(72) Inventor: Richard William Condon, Frankfort, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/368,079

(22) Filed: Jul. 6, 2021

(65) Prior Publication Data

US 2021/0332772 A1    Oct. 28, 2021

Related U.S. Application Data

(63) Continuation of application No. 16/819,717, filed on Mar. 16, 2020, now Pat. No. 11,053,883, which is a continuation of application No. 16/510,859, filed on Jul. 12, 2019, now Pat. No. 10,590,883, which is a continuation of application No. 15/484,076, filed on Apr. 10, 2017, now Pat. No. 10,352,267.

(51) Int. Cl.
| | |
|---|---|
| *F02F 1/00* | (2006.01) |
| *F02F 1/24* | (2006.01) |
| *F02B 75/02* | (2006.01) |
| *F02F 3/28* | (2006.01) |

(52) U.S. Cl.
CPC ........ *F02F 1/002* (2013.01); *F02B 2075/025* (2013.01); *F02B 2075/027* (2013.01); *F02F 1/242* (2013.01); *F02F 3/28* (2013.01)

(58) Field of Classification Search
CPC ...... F02F 1/002; F02F 1/242; F02F 2075/025; F02F 2075/027; F02F 3/28
See application file for complete search history.

(56) References Cited

U.S. PATENT DOCUMENTS

| | | | |
|---|---|---|---|
| 2,497,374 A | 2/1950 | Rouy | |
| 3,468,128 A | 9/1969 | Schutz | |
| 4,191,136 A * | 3/1980 | Matsumoto | F02B 23/08 123/193.5 |
| 4,445,467 A * | 5/1984 | Westerman | F02B 17/005 123/193.5 |
| 4,702,072 A | 10/1987 | Kielhorn | |
| 5,000,132 A | 3/1991 | Takashima | |
| 5,105,795 A * | 4/1992 | Ozawa | F02B 23/101 123/285 |

(Continued)

FOREIGN PATENT DOCUMENTS

| | | |
|---|---|---|
| CA | 2157413 | 3/1997 |
| DE | 3305142 A1 | 8/1984 |

(Continued)

OTHER PUBLICATIONS

Schubert, Frank. "Quick Way to Approximate Parabolas." Machine Design 56, No. 1 at 140-140 (1984).

*Primary Examiner* — Syed O Hasan
(74) *Attorney, Agent, or Firm* — Oldaker Law P.C.; Joseph P. Oldaker

(57) ABSTRACT

Methods for making an apparatus comprising a cylinder for an engine having at least one combustion chamber and a squish area disposed at or around a base of the at least one combustion chamber, wherein the at least one combustion chamber comprises a paraboloidal cavity.

17 Claims, 4 Drawing Sheets

(56) References Cited

U.S. PATENT DOCUMENTS

| | | | | |
|---|---|---|---|---|
| 5,237,972 | A | * | 8/1993 | Groff ............... F02B 23/101 |
| | | | | 123/285 |
| 5,293,851 | A | | 3/1994 | Schaub |
| 5,996,548 | A | * | 12/1999 | Hellmich ............ F02M 51/04 |
| | | | | 123/298 |
| 6,035,824 | A | | 3/2000 | Lee |
| 6,502,540 | B1 | | 1/2003 | Smith |
| 6,701,883 | B2 | * | 3/2004 | Matsumoto ............. F02F 1/38 |
| | | | | 123/193.5 |
| 7,036,492 | B2 | | 5/2006 | Yoshimoto |
| 7,478,619 | B2 | | 1/2009 | Patrono |
| 8,662,025 | B2 | * | 3/2014 | Taki ..................... F02F 1/38 |
| | | | | 123/41.32 |
| 2005/0161015 | A1 | | 7/2005 | Giuliani |
| 2005/0211217 | A1 | | 9/2005 | Boley et al. |
| 2009/0126681 | A1 | | 5/2009 | Cobb |
| 2010/0045157 | A1 | | 2/2010 | Nguyen |

FOREIGN PATENT DOCUMENTS

| | | | |
|---|---|---|---|
| DE | 102008052032 A1 | | 4/2010 |
| JP | 1997280053 | * | 10/1997 |
| WO | 04/059144 A1 | | 7/2004 |

* cited by examiner

PARABOLIC COMBUSTION ENGINE

CROSS REFERENCE TO RELATED APPLICATIONS

This application is a continuation of U.S. patent application Ser. No. 16/819,717 filed on Mar. 16, 2020, now U.S. Pat. No. 11,053,883, which is a continuation of U.S. patent application Ser. No. 16/510,859 filed on Jul. 12, 2019, now U.S. Pat. No. 10,590,883, which is a continuation of U.S. patent application Ser. No. 15/484,076 filed on Apr. 10, 2017, now U.S. Pat. No. 10,352,267.

FIELD OF THE INVENTION

The present invention relates generally to an internal combustion engine having a parabolic-shaped combustion chamber within a cylinder head. The apparatus and method may be utilized with all different engines, including but not limited to two-cycle engines, four-cycle engines, or diesel engines.

BACKGROUND OF THE INVENTION

In internal combustion engines, various shapes have been utilized within the cylinder head of a combustion chamber. Some of the common shapes that have been used include the L-head/flathead configuration; the "bathtub" configuration; the hemispherical ("hemi") configuration; the "wedge" configuration; and the "pent-roof" configuration. Many of these configurations provide certain advantages within certain types of engines. For example, the L-head/flathead configuration has proven to be particularly useful in side-valve engines. Additionally, the bathtub, hemi, and wedge configurations have been proven to be particularly useful in overhead valve engines. However, even in many of the configurations that have been attempted, there is still room to further increase horsepower, reduce emissions, and increase efficiency.

In addition to the foregoing, a squish area has been utilized in the cylinders of certain internal combustion engines to provide enhanced compression during the engine cycle. A squish area is generally created between a piston top surface and the lower surface of a cylinder head forming the combustion chamber. A squish area provides several advantages, including enhanced combustion, and the resultant squish flow functions not only to stir the intake air but also to transfer the intake air toward a sparkplug disposed close to the center of the combustion chamber. Despite the foregoing advantages, many engines do not utilize a squish area in a cylinder and therefore do not realize the attendant advantages of improved efficiency or enhanced compression.

Therefore, a need in the art exists for a new internal combustion engine with enhanced power output, increased efficiency, and smoother running.

SUMMARY OF THE INVENTION

It is therefore a primary object, feature, and/or advantage of the present invention to provide an improved internal combustion engine that overcomes deficiencies in the prior art.

It is another object, feature, and/or advantage of the present invention to provide an internal combustion engine having a parabolic-shaped combustion chamber.

It is another object, feature, and/or advantage of the present invention to provide an internal combustion engine having a squish area within at least one cylinder.

It is another object, feature, and/or advantage of the present invention to provide an internal combustion engine having a squish ratio of greater than 0.5.

It is another object, feature, and/or advantage of the present invention to provide an internal combustion engine having a cylinder with a sparkplug that is offset from the top center of the combustion chamber.

It is another object, feature, and/or advantage of the present invention to provide an internal combustion engine having a cylinder with a parabolic combustion chamber having a fuel injection port to allow for direct fuel injection to the parabolic combustion chamber.

These and/or other objects, features, and advantages of the present invention will be apparent to those skilled in the art. The present invention is not to be limited to or by these objects, features and advantages, and no single embodiment need exhibit every object, feature, and/or advantage.

According to one aspect of the present invention, a cylinder for an internal combustion engine having a combustion chamber comprising a paraboloidal cavity is provided. The cylinder includes a piston, a cylinder head, and a cylinder body where a perimeter of the piston head and a bottom portion of the cylinder head comprise a squish area. The paraboloidal cavity is preferably defined by an elliptic paraboloid (also referred to as a paraboloid of revolution). The cylinder head and cylinder body may be fabricated as separate pieces or as a unitary structure.

According to another aspect of the present invention, the cylinder may also include a port for a sparkplug positioned at a top portion of the cylinder head, so that when a sparkplug is situated within the port, an electrode of the sparkplug rests within the paraboloidal cavity. In certain embodiments, the electrode of the sparkplug may be positioned at or near a focal point of the paraboloidal cavity. In one illustrated embodiment, the sparkplug port is positioned at the top center of the cylinder head. In another illustrated embodiment, the sparkplug port is offset from the top center of the cylinder head.

According to another aspect of the present invention, a method for making a cylinder for an internal combustion engine is provided. The method includes forming a cylinder head comprising a paraboloidal cavity and a base portion, associating a cylinder body with the cylinder head, and placing a piston within the cylinder body so that an outer perimeter of a crown of the piston and the base portion of the cylinder head form a squish area.

DETAILED DESCRIPTION OF EMBODIMENTS

The present invention relates generally to a parabolic-shaped combustion chamber cylinder head that is used to increase the horsepower of primarily, but not limited to, any two-cycle engine. It may also be adapted to function in any four-cycle engine or diesel engine. A parabolic surface focuses light rays in essentially straight lines as evidenced by a searchlight or spotlight. This invention applies the same principle to focus straight lines of force caused by the combustion of engine gases within a combustion chamber in an internal combustion engine and direct them in straight lines toward the crown of a piston. This causes the piston in the engine to move downward with increased force, resulting in increased horsepower for the engine.

The cylinder head comprising a parabolic-shaped combustion chamber preferably employs a squish area. "Squish" is an effect in internal combustion engines which creates turbulence of the fuel/air mixture as the piston approaches the combustion chamber. In an engine utilizing a squish area, an outer perimeter of the piston crown comes very close to the cylinder head during operation. As such, the "squish area" is the area within a cylinder of an internal combustion engine that is made to very nearly come into contact with the piston when the piston is at top dead center. As a piston approaches a squish area, the gases present are compressed and then suddenly pushed out of the squish area and within the combustion chamber, creating turbulence. This promotes thorough fuel/air mixing, a factor beneficial to efficient combustion. Squish areas are generally utilized in a few types of internal combustion engines, including overhead valve engines and overhead camshaft engines. The present invention utilizes both a parabolic combustion chamber in a cylinder head and a squish area at a base of the cylinder head to provide enhanced horsepower and efficiency.

Figure 1:
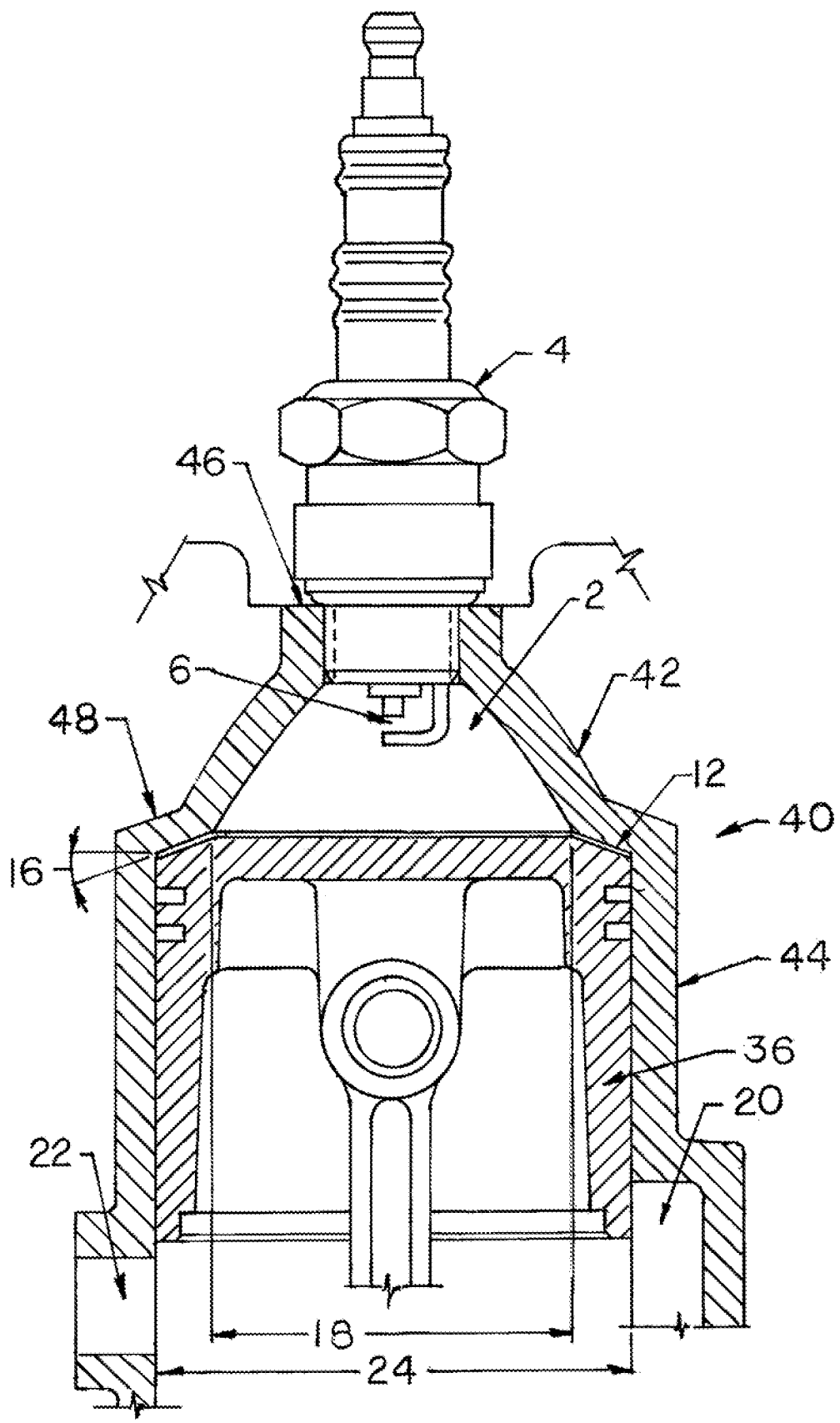
FIG. 1 is a cross-sectional view of a cylinder of an internal combustion engine having a combustion chamber and piston configuration in accordance with a first embodiment of the present invention where a combustion chamber comprising a paraboloidal cavity is utilized in conjunction with a squish area at the base of the combustion chamber.

Referring now to the drawing wherein like numerals refer to like parts, FIG. 1 is a cross-sectional view of a cylinder of an internal combustion engine in accordance with a first embodiment, depicted as cylinder 40 comprising a cylinder head 42 and cylinder body 44. The cylinder head 42 includes a parabolic combustion chamber 2, a port 46 for accepting a sparkplug 4, and a base portion 48. The cylinder body 44 includes an intake port 20, an exhaust port 22, and a piston 36 disposed within the cylinder body 44. The cylinder body 44 further includes a cylinder bore with a cylinder bore diameter 24.

In this first embodiment, a squish area 12 may be seen at the base of the parabolic combustion chamber 2. The squish area 12 is shown as being angled with respect to the top of piston 36, denoted by squish angle 16. In the illustrated configuration, any gases within the squish area 12 during operation of the piston 36 will be expelled toward the center or top of the parabolic combustion chamber 2. Therefore, an angled configuration of the squish area is preferred but not required. As appreciated by those of skill in the art, other configurations of the squish area 12 are within the scope of this invention. For instance, a configuration where the squish area is coplanar with a flat piston head will still provide the attendant advantages of a squish area, even though such an embodiment is not angled.

The parabolic combustion chamber 2 comprises a psaraboloidal cavity. Preferably, the paraboloidal cavity may be defined by a three-dimensional surface produced by the following equation.

$$z = \frac{x^2}{a^2} + \frac{y^2}{b^2}$$

This equation represents an elliptic paraboloid as a three-dimensional surface, in a suitable coordinate system with three axes (x, y, and z), where a and b are constants that dictate the level of curvature in the xz and yz planes respectively. Alternatively, the paraboloidal cavity may be approximated by utilizing various techniques, including through the use of commercial CAD drawing software suites. For instance, some CAD software programs include a parabola utility, where a parabolic curve may be placed in a three-dimensional workspace and revolved around an axis to create a paraboloid. Alternatively or additionally, the paraboloidal cavity may be approximated utilizing various known techniques, such as those taught in Frank Schubert's article entitled, "Quick Way to Approximate Parabolas," published in Machine Design 56, no. 1 at 140-140 (1984), which is incorporated by reference in its entirety.

The volume of the parabolic combustion chamber 2 may be calculated by using the formula for volume of a paraboloid, where r is the radius of the rim at the base or top of the paraboloid, and h is the height of the paraboloid.

$$V = \frac{1}{2}\pi(r^2 h)$$

In addition, a nose of the sparkplug 4 may be positioned such that a spark produced by the sparkplug 4 will be presented at or near the focal point 6 of the parabolic combustion chamber 2. This concept has some limitations for very small cylinder heads due to the size of available sparkplugs. An extended nose sparkplug may be utilized as well, as this will place the spark further into the parabolic combustion chamber. As such, if one wishes to utilize a parabolic combustion chamber where the spark will be at the focal point of the parabolic combustion chamber, the formula for the paraboloidal cavity should be modified to accommodate this change in focal point. Other types of ignition devices may also be considered, but it is highly desirable for such devices to place a spark at or near the focal point 6 of the paraboloidal combustion chamber 2. In the embodiment shown in FIG. 1, the electrode of sparkplug 4 is placed near the focal point 6 of parabolic combustion chamber 2 so that a spark may be generated at the focal point 6.

It should be understood that these general principles regarding the nature of the parabolic combustion chamber may apply to each of the paraboloidal cavities present in other embodiments of this invention.

The embodiment shown in FIG. 1 includes a unitary cylinder. In other words, the cylinder head 42 and cylinder body 44 are depicted as a single structure. As such, in order to manufacture the cylinder head 42 and cylinder body 44 as depicted in FIG. 1, they must be fabricated or otherwise produced as one unit. However, it may be advantageous for many reasons to fabricate or produce cylinder head 42 and cylinder body 44 as separate pieces. This may provide cost advantages in manufacturing, as the various components may be machined in different ways. In embodiments where cylinder head 42 and cylinder body 44 are produced as separate pieces, those pieces may be attached in many different ways, including but not limited to welding, threading, bolts, or tic rods so as to result in cylinder 40.

In operation, the embodiment of a cylinder for an internal combustion engine shown in FIG. 1 is generally the same as most two-cycle engines. First, a fuel/air mixture is drawn into the parabolic combustion chamber 2 through intake port 20 by movement of the piston 36. As the piston 36 rises, it compresses the fuel/air mixture, urging the fuel/air mixture into parabolic combustion chamber 2. In addition to creating compression, the upward movement of the piston 36 creates squish flow as the fuel/air mixture interacts with squish area 12 to compress the fuel/air mixture introduced by intake port 20 and urge the fuel/air mixture toward sparkplug 4 disposed at or near the focal point 6 of the parabolic combustion chamber 2. At some timing distance from the top of the stroke, the sparkplug 4 ignites the compressed fuel/air mixture. The burning fuel expands, driving the piston 36 downward. As the piston 36 is urged downward, this exposes the exhaust port 22, allowing any exhaust to exit the cylinder 40. While the depicted embodiments primarily relate to two-cycle engines, it should be appreciated that this invention is not so limited. This invention may be adapted for any engine, including but not limited to four-cycle engines or diesel engines.

Figure 2:
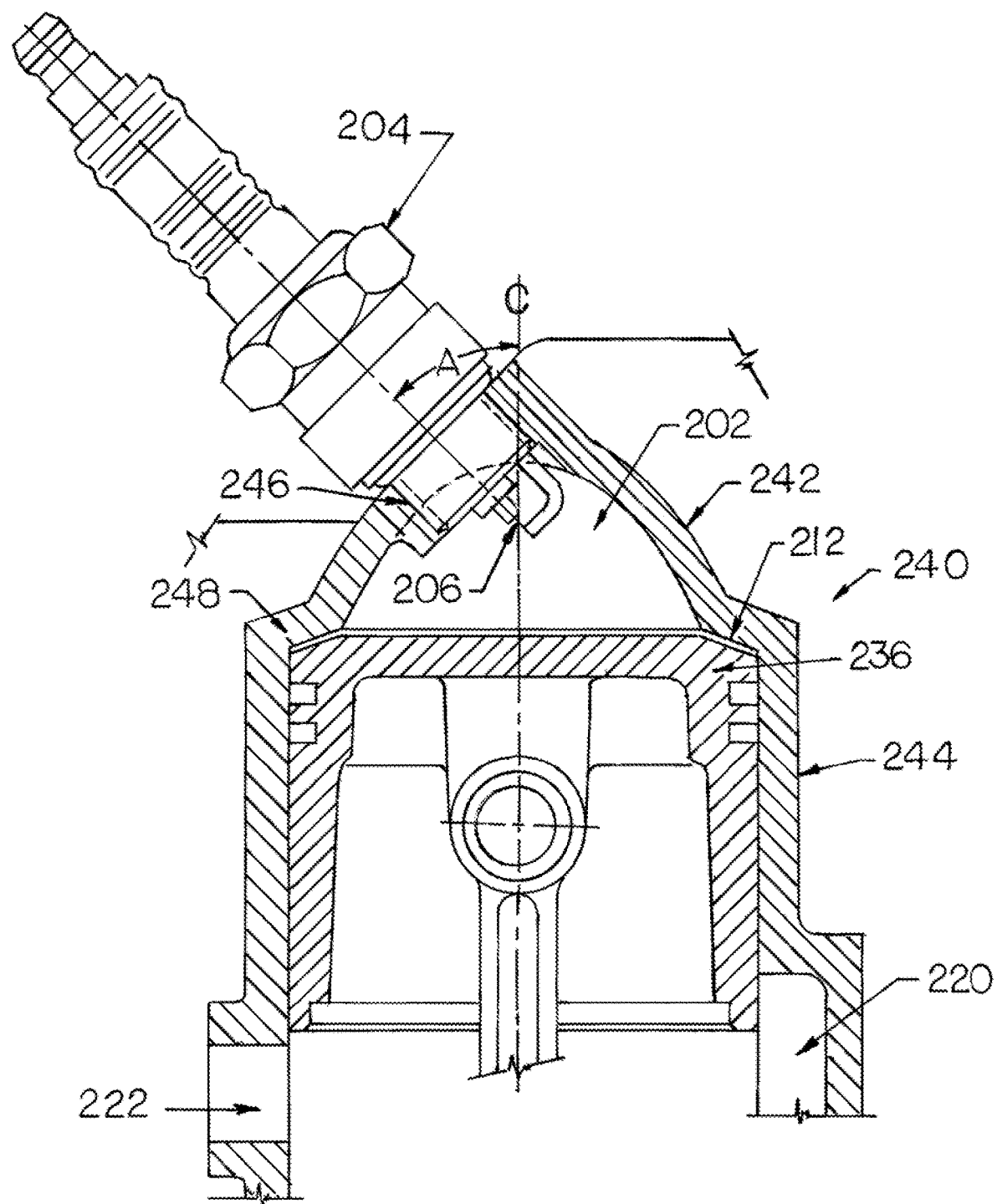
FIG. 2 is a cross-sectional view of a cylinder of an internal combustion engine having a combustion chamber and piston configuration in accordance with a second embodiment of the present invention where a sparkplug is offset from the centerline of the cylinder.

In a second embodiment illustrated in FIG. 2, a sparkplug 204 and port 246 for accepting the sparkplug are offset from the centerline C of the cylinder 240. As with the first embodiment, the cylinder 240 includes a cylinder head 242 and cylinder body 244. The cylinder head 242 includes a parabolic combustion chamber 202, and a port 246 for accepting sparkplug 204. A squish area 212 may be seen at the base 248 of the parabolic combustion chamber 202. Disposed within the cylinder body 244 is a piston 236, and the cylinder body includes an intake port 220 and exhaust port 222. The primary difference between the embodiments of FIGS. 1 and 2 lies in the disposition of the sparkplug 204 and port 246 with respect to the cylinder 240. In the embodiment shown in FIG. 2, the electrode of sparkplug 204 is placed at or near the focal point 206 of parabolic combustion chamber 202 despite the sparkplug 204 being offset from the centerline of the cylinder 240. While not required, it is advantageous to maintain the electrode of the sparkplug at or near the focal point of the parabolic combustion chamber to maximize the attendant advantages of utilizing a parabolic combustion chamber.

FIG. 2 provides an embodiment where it may be advantageous to orient a sparkplug to satisfy a particular design constraint. As a non-limiting example of such a design constraint: in certain small engines, such as those used in lawnmowers, line or string trimmers, chainsaws or the like, the equipment design may dictate that the engine be positioned in a manner that hinders technician access to the sparkplug. In such cases, a configuration such as that shown in FIG. 1 may be acceptable, but the technician may have to remove housings or otherwise disassemble the equipment to access the sparkplug. By offsetting the sparkplug 204 from the centerline C of the cylinder 240 by some angle A as shown in FIG. 2, this may provide the advantage of allowing a technician or user of the engine to access the sparkplug without having to remove housings or disassemble the equipment.

Figure 3:
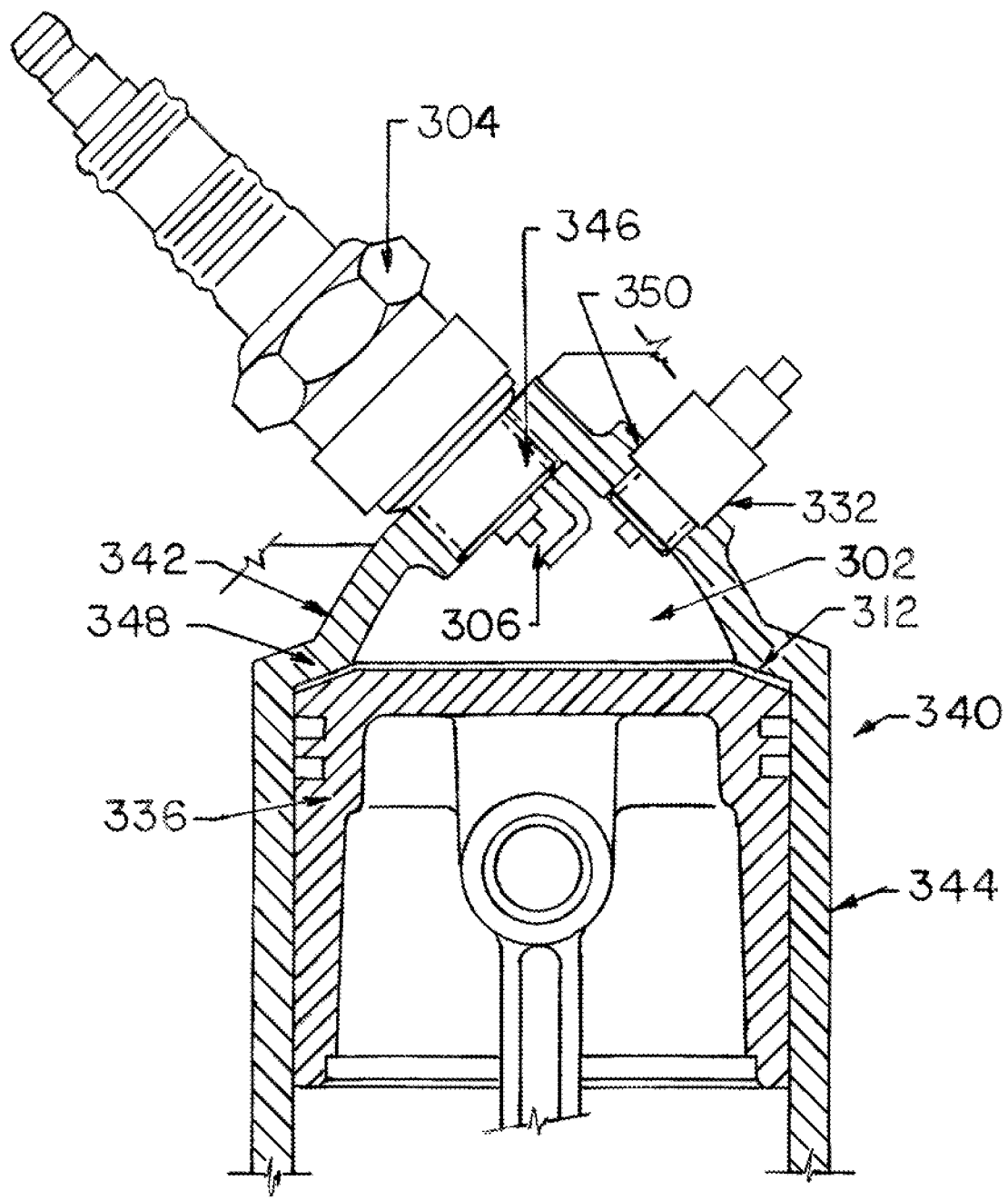
FIG. 3 is a cross-sectional view of a cylinder of an internal combustion engine having a combustion chamber and piston configuration in accordance with a third embodiment of the present invention where a sparkplug is offset from the centerline of the cylinder and a direct fuel injection port and nozzle are incorporated into the top of the cylinder.

In addition to addressing certain design constraints, there are other advantages of offsetting the sparkplug from the centerline of the cylinder, such as providing for direct fuel injection into the combustion chamber as shown in the embodiment illustrated in FIG. 3. FIG. 3 is similar in certain respects to the embodiment illustrated in FIG. 2; however, the embodiment of FIG. 3 has been modified to allow for direct fuel injection into the parabolic combustion chamber. As with the embodiment shown in FIG. 2, the cylinder 340 includes a cylinder head 342 and cylinder body 344. The cylinder head 342 includes a parabolic combustion chamber 302 and a port 346 for accepting sparkplug 304. The cylinder head 342 further includes a fuel injection port 350 and a fuel injection nozzle 332 disposed therein. A squish area 312 may be seen at the base 348 of the parabolic combustion chamber 302. Disposed within the cylinder body 344 is a piston 336. The advantages of utilizing direct fuel injection are decreased emissions and increased engine efficiency. For example, in two-cycle engines, the intake port is no longer required.

In the embodiment illustrated FIG. 3, the electrode of sparkplug 304 is placed at the focal point 306 of parabolic combustion chamber 302 despite the sparkplug 304 being offset from the centerline of the cylinder 340 and the presence of the fuel injection nozzle 332. While not required, it is advantageous to maintain the electrode of the sparkplug at or near the focal point of the parabolic combustion chamber to maximize the attendant advantages of utilizing a parabolic combustion chamber.

In operation, the embodiment of a cylinder for an internal combustion engine shown in FIG. 3 differs from that of most two-cycle engines. First, fuel is injected into the parabolic combustion chamber 302 through fuel injection port 350 when piston 336 is descending. As the piston 336 completes its downward cycle and begins to rise, it begins to compress the fuel within the cylinder 340, urging the fuel into parabolic combustion chamber 302. In addition to creating compression, the upward movement of the piston 336 creates squish flow as the fuel interacts with squish area 312 and urges the fuel toward sparkplug 304 disposed at or near the focal point 306 of the parabolic combustion chamber 302. At some point in the stroke, the sparkplug 304 ignites the compressed fuel. The burning fuel expands, again driving the piston 336 downward.

Figure 4:
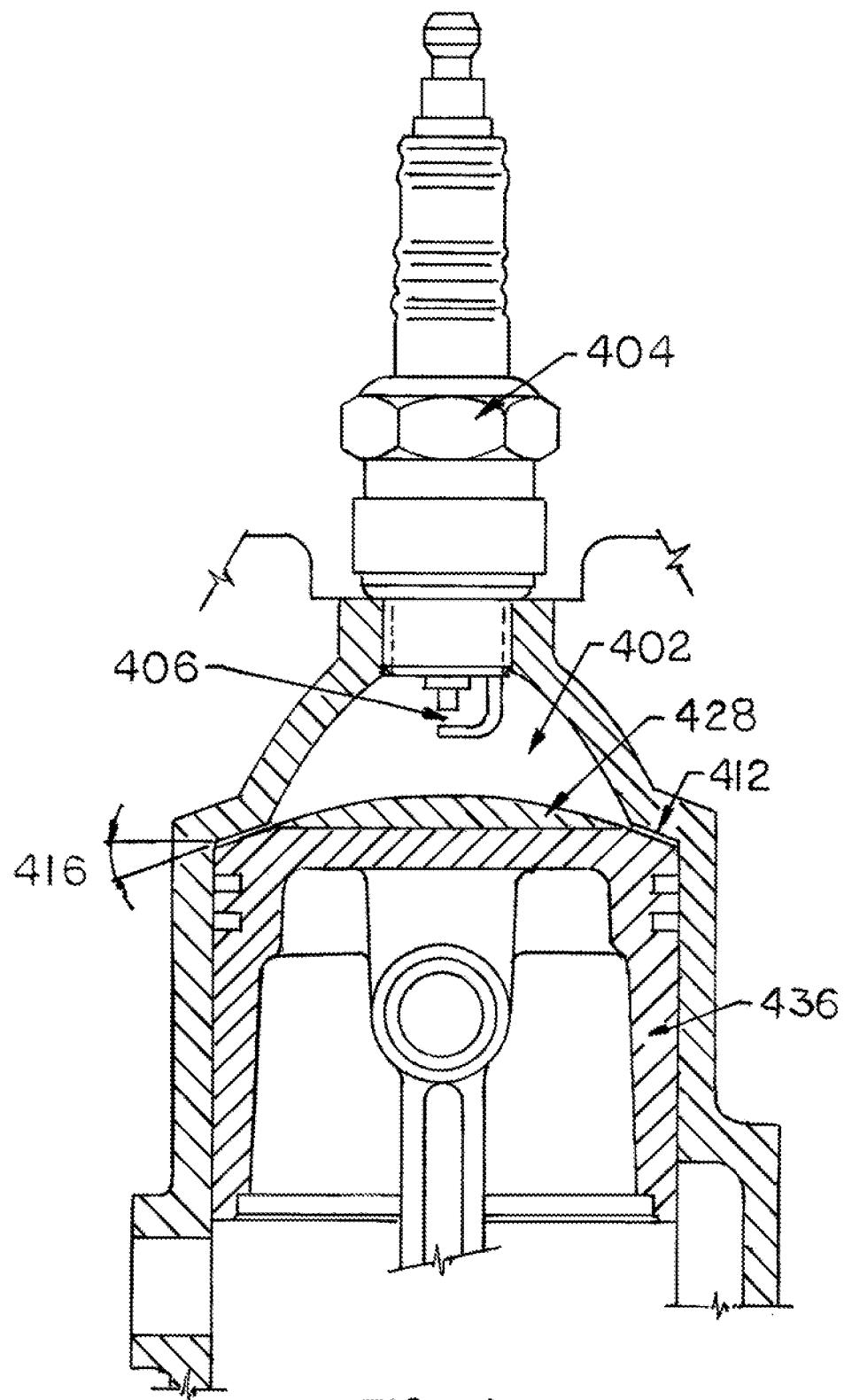
FIG. 4 is a cross-sectional view of a cylinder of an internal combustion engine having a combustion chamber and piston configuration in accordance with a fourth embodiment of the present invention having a volumetrically-enhanced piston top.

FIG. 4 shows a fourth embodiment of the invention, where a piston configuration is utilized to further enhance compression. This fourth embodiment utilized a curved, domed, or otherwise volumetrically enhanced piston top. As shown in FIG. 4, a domed portion 428 may be incorporated onto the top or crown of piston 436. This addition to the piston surface reduces the volume of the parabolic combustion chamber 402 when the piston is at the top of a stroke, thus raising the compression ratio of the engine. Domed portion 428 shows the volume of the added curved piston top. Various other shapes such as a truncated frustum of a cone may also be employed instead of a dome. The radius of the domed portion 428 may be established by setting a line perpendicular to the squish angle 416 and drawing it downward to intersect the centerline of the piston 436 diameter. The embodiment of FIG. 4 includes a squish area 412 and focal point 406.

A method for making a cylinder for an internal combustion engine is provided below. The method includes forming a cylinder head comprising a paraboloidal cavity and a base portion, associating a cylinder body with the cylinder head, and placing a piston within the cylinder body so that an outer perimeter of a crown of the piston and the base portion of the cylinder head form a squish area. Alternatively, the cylinder body and cylinder head may be formed as one piece, as described above. Ports may be formed in the cylinder head, including but not limited to a sparkplug port and/or a fuel injection port. The sparkplug port may be formed in the cylinder head to align with a centerline of the cylinder body, or offset from the centerline. The cylinder body may include an intake port and an exhaust port. Most of these components may be formed by any known manufacturing process for engine parts, such as machining, molding, injection molding, CNC machining, or the like.

The illustrated embodiments as described include where the internal combustion engine is a single cylinder, two-cycle engine. However, the principles of this invention may apply to any type of engine, such as a four-cycle engine, a multi-cylinder engine, and/or a diesel engine. However, it has been found that this invention is particularly suited for two-cycle engines, particularly single cylinder, two-cycle engines.

In all embodiments, it may be advantageous to utilize a squish ratio greater than 0.5. Generally, when a squish ratio is greater than 0.5 in a cylinder, an engine containing such a cylinder is considered to be a high performance engine. This ratio is calculated by dividing the squish diameter by the cylinder bore diameter. If the resultant ratio is greater than 0.5 for the cylinder, then an engine that includes the cylinder may be considered a high performance engine. As a non-limiting example, the cylinder of FIG. 1 includes squish diameter 18 and cylinder bore diameter 24. Dividing the squish diameter 18 by the cylinder bore diameter 24 will provide the squish ratio for cylinder 40.

The disclosed embodiments have many attendant advantages. As a first example, cylinders having a parabolic combustion chamber will produce enhanced horsepower in the engines that contain them. As a second example, cylinders having a squish area will exhibit enhanced efficiency and horsepower. Those engines with a cylinder having both a parabolic combustion chamber and a squish area will heighten these advantages. As a third example, a volumetrically enhanced piston top or crown will provide the advantage of enhancing compression within the cylinder. In addition, utilizing direct fuel injection in a cylinder having a parabolic combustion chamber will result in an engine with decreased emissions and increased efficiency.

It should be understood that various changes and modifications to the embodiments described herein will be apparent to those skilled in the art. Such changes and modifications may be made without departing from the spirit and scope of the present invention and without diminishing its attendant advantages. It is, therefore, intended that such changes and modifications be covered by any claims.

The invention is claimed as follows:

1. A method of making a cylinder, comprising:
    forming a cylinder comprising at least one combustion chamber having a paraboloidal cavity and a squish area having a non-zero squish angle disposed at or around a base of the at least one combustion chamber;
    adapting the cylinder to include a sparkplug port, whereby an electrode of a sparkplug may be positioned at or near a focal point of the paraboloidal cavity via the sparkplug port;
    providing a piston with a volumetrically-enhanced portion, wherein the volumetrically-enhanced portion is adapted to extend into the paraboloidal cavity when the piston is at top dead center; and
    placing the piston within the cylinder;
    wherein the cylinder has a squish ratio greater than or equal to 0.5.

2. The method of claim 1, wherein forming the cylinder comprises machining, molding, injection molding, or CNC machining.

3. The method of claim 2, wherein adapting the cylinder comprises machining, cutting, molding, injection molding, or CNC machining.

4. The method of claim 3, wherein the cylinder comprises a cylinder body and a cylinder head.

5. The method of claim 4, wherein the cylinder body and cylinder head are formed of a unitary construction.

6. The method of claim 4, wherein the cylinder head comprises the at least one combustion chamber and the sparkplug port.

7. The method of claim 6, further comprising forming a fuel injection port in the cylinder head.

8. The method of claim 7, wherein forming the fuel injection port within the cylinder head comprises machining, cutting molding, injection molding, or CNC machining.

9. The method of claim 8, wherein the fuel injection port is formed offset from a centerline of the cylinder.

10. The method of claim 8, wherein the sparkplug port is formed offset from the centerline of the cylinder.

11. The method of claim 1, wherein the cylinder has a squish ratio between 0.5 and 0.8.

12. A method of making an engine comprising:
    providing at least one cylinder made by the method of claim 1; and
    placing the at least one cylinder within the engine.

13. The method of claim 12, wherein the engine is an internal combustion engine.

14. The method of claim 13, wherein the internal combustion engine is selected from the group consisting of a four-cycle engine, a two-cycle engine, and a diesel engine.

15. The method of claim 12, further comprising placing a plurality of additional cylinders within the engine.

16. The method of claim 15, wherein each of the plurality of additional cylinders is made by the method of claim 1.

17. The method of claim 12, wherein the engine has a squish ratio between 0.5 and 0.8.

* * * * *